United States Patent
Chen et al.

(10) Patent No.: US 8,856,261 B2
(45) Date of Patent: Oct. 7, 2014

(54) NETWORK SUPPORT FOR SYSTEM INITIATED CHECKPOINTS

(71) Applicant: International Business Machines Corporation, Armonk, NY (US)

(72) Inventors: Dong Chen, Croton on Hudson, NY (US); Philip Heidelberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/729,937

(22) Filed: Dec. 28, 2012

(65) Prior Publication Data
US 2013/0138759 A1     May 30, 2013

Related U.S. Application Data

(63) Continuation of application No. 12/731,796, filed on Mar. 25, 2010, now Pat. No. 8,359,367.

(60) Provisional application No. 61/293,476, filed on Jan. 8, 2010.

(51) Int. Cl.
G06F 15/167   (2006.01)
G06F 11/00    (2006.01)
G06F 7/38     (2006.01)

(52) U.S. Cl.
USPC .............................. 709/212; 714/16; 712/228

(58) Field of Classification Search
None
See application file for complete search history.

(56) References Cited

U.S. PATENT DOCUMENTS

| 5,964,835 | A  | * | 10/1999 | Fowler et al. ................. 709/216 |
| 6,622,263 | B1 |   | 9/2003  | Stiffler et al. |
| 7,437,606 | B2 |   | 10/2008 | Janakiraman et al. |
| 2007/0244962 | A1 | | 10/2007 | Laadan et al. |
| 2008/0267176 | A1 | | 10/2008 | Ganesh et al. |
| 2010/0185719 | A1 | | 7/2010  | Howard |

* cited by examiner

*Primary Examiner* — Wen-Tai Lin
(74) *Attorney, Agent, or Firm* — Scully, Scott, Murphy & Presser, P.C.; Daniel P. Morris, Esq.

(57) ABSTRACT

A system, method and computer program product for supporting system initiated checkpoints in parallel computing systems. The system and method generates selective control signals to perform checkpointing of system related data in presence of messaging activity associated with a user application running at the node. The checkpointing is initiated by the system such that checkpoint data of a plurality of network nodes may be obtained even in the presence of user applications running on highly parallel computers that include ongoing user messaging activity.

20 Claims, 13 Drawing Sheets

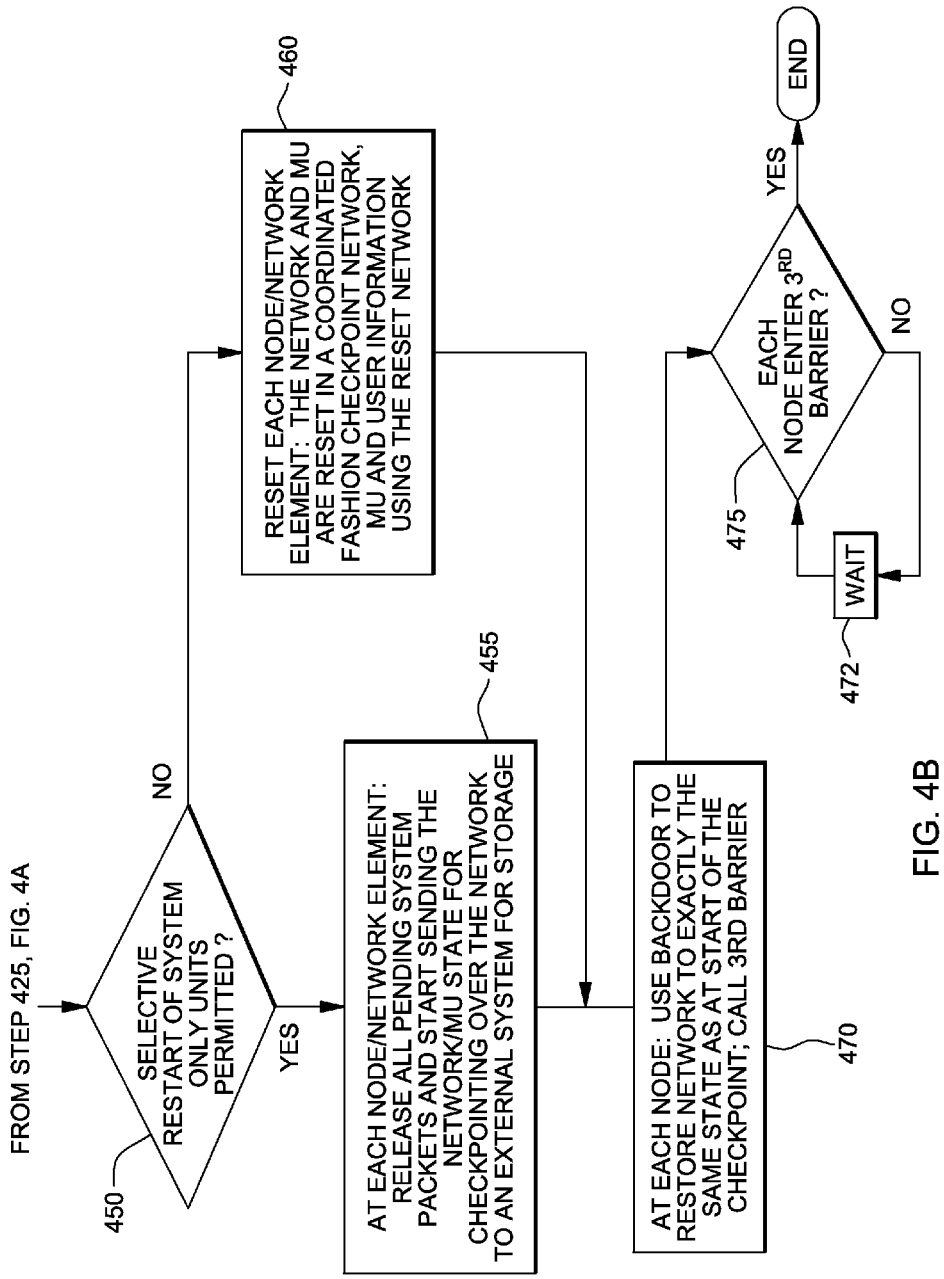

501

| BITS | NAME | DESCRIPTION | RESET |
|---|---|---|---|
| 0 | inj_t0_unit_stop | injection fifo torus 0 unit stop | 0 |
| 1 | inj_t1_unit_stop | injection fifo torus 1 unit stop | 0 |
| 2 | inj_t2_unit_stop | injection fifo torus 2 unit stop | 0 |
| 3 | inj_t3_unit_stop | injection fifo torus 3 unit stop | 0 |
| 4 | inj_t4_unit_stop | injection fifo torus 4 unit stop | 0 |
| 5 | inj_t5_unit_stop | injection fifo torus 5 unit stop | 0 |
| 6 | inj_t6_unit_stop | injection fifo torus 6 unit stop | 0 |
| 7 | inj_t7_unit_stop | injection fifo torus 7 unit stop | 0 |
| 8 | inj_t8_unit_stop | injection fifo torus 8 unit stop | 0 |
| 9 | inj_t9_unit_stop | injection fifo torus 9 unit stop | 0 |
| 10 | inj_l0_unit_stop | injection fifo local 0 unit stop | 0 |
| 11 | inj_l1_unit_stop | injection fifo local 1 unit stop | 0 |
| 12 | inj_hp_unit_stop | injection fifo torus high priority unit stop | 0 |
| 13 | inj_io_unit_stop | injection fifo torus system I/O unit stop | 0 |
| 14 | inj_c0_unit_stop | injection fifo collective 0 (user) unit stop | 0 |
| 15 | inj_c1_unit_stop | injection fifo collective 1 (system) unit stop | 0 |
| 16 | rcp_t0_unit_stop | reception fifo torus 0 unit stop | 0 |
| 17 | rcp_t1_unit_stop | reception fifo torus 1 unit stop | 0 |
| 18 | rcp_t2_unit_stop | reception fifo torus 2 unit stop | 0 |
| 19 | rcp_t3_unit_stop | reception fifo torus 3 unit stop | 0 |
| 20 | rcp_t4_unit_stop | reception fifo torus 4 unit stop | 0 |
| 21 | rcp_t5_unit_stop | reception fifo torus 5 unit stop | 0 |
| 22 | rcp_t6_unit_stop | reception fifo torus 6 unit stop | 0 |
| 23 | rcp_t7_unit_stop | reception fifo torus 7 unit stop | 0 |
| 24 | rcp_t8_unit_stop | reception fifo torus 8 unit stop | 0 |
| 25 | rcp_t9_unit_stop | reception fifo torus 9 unit stop | 0 |
| 26 | rcp_l0_unit_stop | reception fifo local 0 unit stop | 0 |
| 27 | rcp_l1_unit_stop | reception fifo local 1 unit stop | 0 |
| 28 | rcp_hp_unit_stop | reception fifo torus high priority unit stop | 0 |
| 29 | rcp_io_unit_stop | reception fifo torus system I/O unit stop | 0 |
| 30 | rcp_c0_unit_stop | reception fifo collective 0 (user) unit stop | 0 |
| 31 | rcp_c1_unit_stop | reception fifo collective 1 (user) unit stop | 0 |
| 32:63 | value | control | 00000000 |

| BITS | NAME | DESCRIPTION | RESET |
|---|---|---|---|
| 0 | dcrs out | Reset all DCR registers except this one | 1 |
| 1 | inj t0 | Reset Injection fifo torus 0 | 1 |
| 2 | inj t1 | Reset Injection fifo tours 1 | 1 |
| 3 | inj t2 | Reset Injection fifo torus 2 | 1 |
| 4 | inj t3 | Reset Injection fifo torus 3 | 1 |
| 5 | inj t4 | Reset Injection fifo torus 4 | 1 |
| 6 | inj t5 | Reset Injection fifo torus 5 | 1 |
| 7 | inj t6 | Reset Injection fifo torus 6 | 1 |
| 8 | inj t7 | Reset injection fifo torus 7 | 1 |
| 9 | inj t8 | Reset injection fifo torus 8 | 1 |
| 10 | inj t9 | Reset Injection fifo torus 9 | 1 |
| 11 | inj l0 | Reset Injection fifo local 0 | 1 |
| 12 | inj l1 | Reset Injection fifo local 1 | 1 |
| 13 | inj hp | Reset Injection fifo torus high priority | 1 |
| 14 | inj io | Reset Injection fifo torus system I/O | 1 |
| 15 | inj c0 | Reset Injection fifo collective 0 | 1 |
| 16 | inj c1 | Reset Injection fifo collective 1 | 1 |
| 17 | rcp t0 | Reset reception fifo torus 0 | 1 |
| 18 | rcp t1 | Reset reception fifo torus 1 | 1 |
| 19 | rcp t2 | Reset reception fifo torus 2 | 1 |
| 20 | rcp t3 | Reset reception fifo torus 3 | 1 |
| 21 | rcp t4 | Reset reception fifo torus 4 | 1 |
| 22 | rcp t5 | Reset reception fifo torus 5 | 1 |
| 23 | rcp t6 | Reset reception fifo torus 6 | 1 |
| 24 | rcp t7 | Reset reception fifo torus 7 | 1 |
| 25 | rcp t8 | Reset reception fifo torus 8 | 1 |
| 26 | rcp t9 | Reset reception fifo torus 9 | 1 |
| 27 | rcp l0 | Reset reception fifo local 0 | 1 |
| 28 | rcp l1 | Reset reception fifo local 1 | 1 |
| 29 | rcp hp | Reset reception fifo torus high priority | 1 |
| 30 | rcp io | Reset reception fifo torus system I/O | 1 |
| 31 | rcp c0 | Reset reception fifo collective 0 | 1 |
| 32 | rcp c1 | Reset reception fifo collective 1 | 1 |
| 32:63 | Reserved | Write data is ignored. Read data will be zero | 00000000 |

FIG. 5B

| BITS | NAME | DESCRIPTION | RESET |
|---|---|---|---|
| 0 | re_link_stop | receiver link stop, shutoff incoming link from SerDes ports | 0 |
| 1 | se_link_stop | sender link stop, shutoff outgoing link, sending IDLEs to SerDes | 0 |
| 2 | re_unit_stop | receiver unit stop | 0 |
| 3 | se_unit_stop | sender unit stop | 0 |
| 4 | se_retrans_stop | sender retransmission stop | 0 |
| 5 | se_drop_pkt_usr | sender drop user packets | 0 |
| 6 | se_drop_pkt_sys | sender drop system packets | 0 |
| 7 | re_disable_hdrchk | receiver disable complex header checker | 0 |
| 8:63 | value | control 0 for unit stop, drop packets, etc. | 000000000000000 |

NETWORK SUPPORT FOR SYSTEM INITIATED CHECKPOINTS

CROSS-REFERENCE TO RELATED PATENT APPLICATIONS

The present disclosure is a continuing application of and claims the benefit of commonly-owned, co-pending U.S. patent application Ser. No. 12/731,796 filed Mar. 25, 2010, the entire contents and disclosure of each of which is expressly incorporated by reference herein as if fully set forth herein.

PRIORITY CLAIM

This disclosure claims priority from U.S. Provisional Patent Application No. 61/293,476, filed on Jan. 8, 2010, the entire contents and disclosure of which is expressly incorporated by reference herein as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED PATENT APPLICATIONS

The present disclosure is related to the following commonly-owned, U.S. patent applications, the entire contents and disclosure of each of which is expressly incorporated by reference herein as if fully set forth herein. U.S. Pat. No. 8,275,954, for "USING DMA FOR COPYING PERFORMANCE COUNTER DATA TO MEMORY"; U.S. Pat. No. 8,275,964 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. Pat. No. 8,468,275, for "HARDWARE SUPPORT FOR SOFTWARE CONTROLLED FAST RECONFIGURATION OF PERFORMANCE COUNTERS"; U.S. Pat. No. 8,347,001, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. Pat. No. 8,595,389, for "DISTRIBUTED PERFORMANCE COUNTERS"; U.S. Pat. No. 8,103,910, for "LOCAL ROLLBACK FOR FAULT-TOLERANCE IN PARALLEL COMPUTING SYSTEMS"; U.S. Pat. No. 8,447,960, for "PROCESSOR WAKE ON PIN"; U.S. Pat. No. 8,268,389, for "PRECAST THERMAL INTERFACE ADHESIVE FOR EASY AND REPEATED, SEPARATION AND REMATING"; U.S. Pat. No. 8,359,404, for "ZONE ROUTING IN A TORUS NETWORK"; U.S. patent application Ser. No. 12/684,852, for "PROCESSOR WAKEUP UNIT"; U.S. Pat. No. 8,429,377, for "TLB EXCLUSION RANGE"; U.S. Pat. No. 8,356,122, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. Pat. No. 8,473,683, for "ORDERING OF GUARDED AND UNGUARDED STORES FOR NO-SYNC I/O"; U.S. Pat. No. 8,458,267, for "DISTRIBUTED PARALLEL MESSAGING FOR MULTIPROCESSOR SYSTEMS"; U.S. Pat. No. 8,086,766, for "SUPPORT FOR NON-LOCKING PARALLEL RECEPTION OF PACKETS BELONGING TO THE SAME MESSAGE"; U.S. Pat. No. 8,571,834, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. Pat. No. 8,533,399, for "CACHE DIRECTORY LOOK-UP REUSE"; U.S. Pat. No. 8,621,478, for "MEMORY SPECULATION IN A MULTI LEVEL CACHE SYSTEM"; U.S. Pat. No. 8,751,748, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. Pat. No. 8,255,633, for "LIST BASED PREFETCH"; U.S. Pat. No. 8,347,039, for "PROGRAMMABLE STREAM PREFETCH WITH RESOURCE OPTIMIZATION"; U.S. Pat. No. 8,788,879, for "FLASH MEMORY FOR CHECKPOINT STORAGE"; U.S. Pat. No. 8,327,077, for "TWO DIFFERENT PREFETCH COMPLEMENTARY ENGINES OPERATING SIMULTANEOUSLY"; U.S. Pat. No. 8,364,844, for "DEADLOCK-FREE CLASS ROUTES FOR COLLECTIVE COMMUNICATIONS EMBEDDED IN A MULTI-DIMENSIONAL TORUS NETWORK"; U.S. Pat. No. 8,549,363, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. Pat. No. 8,571,847, for "IMPROVING THE EFFICIENCY OF STATIC CORE TURN OFF IN A SYSTEM-ON-A-CHIP WITH VARIATION"; U.S. Pat. No. 8,782,164, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. Pat. No. 8,370,551 for "ARBITRATION IN CROSSBAR FOR LOW LATENCY"; U.S. Pat. No. 8,312,193 for "EAGER PROTOCOL ON A CACHE PIPELINE DATAFLOW"; U.S. Pat. No. 8,521,990 for "EMBEDDED GLOBAL BARRIER AND COLLECTIVE IN A TORUS NETWORK"; U.S. Pat. No. 8,412,974 for "GLOBAL SYNCHRONIZATION OF PARALLEL PROCESSORS USING CLOCK PULSE WIDTH MODULATION"; U.S. patent application Ser. No. 12/796,411 for "IMPLEMENTATION OF MSYNC"; U.S. patent application Ser. No. 12/796,389 for "NON-STANDARD FLAVORS OF MSYNC"; U.S. Pat. No. 8,713,294 for "HEAP/STACK GUARD PAGES USING A WAKEUP UNIT"; U.S. Pat. No. 8,527,740 for "MECHANISM OF SUPPORTING SUB-COMMUNICATOR COLLECTIVES WITH 0(64) COUNTERS AS OPPOSED TO ONE COUNTER FOR EACH SUB-COMMUNICATOR"; and U.S. Pat. No. 8,595,554 for "REPRODUCIBILITY IN BGQ".

BACKGROUND

The present invention relates generally to checkpointing in computer systems; and, particularly, to checkpoints in applications running on high performance parallel computers.

To achieve high performance computing, multiple individual processors have been interconnected to form a multiprocessor computer system capable of parallel processing. Multiple processors can be placed on a single chip, or several chips—each containing one or more processors—become interconnected to form single— or multi-dimensional computing networks into a multiprocessor computer system, such as described in co-pending U.S. Patent Publication No. 2009/0006808 A1 corresponding to U.S. patent application Ser. No. 11/768,905, the whole contents and disclosure of which is incorporated by reference as if fully set forth herein, describing a massively parallel supercomputing system.

Some processors in a multiprocessor computer system, such as a massively parallel supercomputing system, typically implement some form of direct memory access (DMA) functionality that facilitates communication of messages within and among network nodes, each message including packets containing a payload, e.g., data or information, to and from a memory, e.g., a memory shared among one or more processing elements. Types of messages include user messages (applications) and system initiated (e.g., operating system) messages.

Generally, a uni-or multi-processor system communicates with a single DMA engine, typically having multi-channel capability, to initialize data transfer between the memory and a network device (or other I/O device).

Such a DMA engine may directly control transfer of long messages, which long messages are typically preceded by short protocol messages that are deposited into reception FIFOs on a receiving node (for example, at a compute node). Through these protocol messages, the sender compute node and receiver compute node agree on which injection counter and reception counter (not shown) identifications to use, and what the base offsets are for the messages being processed. The software is constructed so that the sender and receiver nodes agree to the counter ids and offsets without having to send such protocol messages.

In parallel computing system, such as BlueGene® (a trademark of International Business Machines Corporation, Armonk N.Y.), system messages are initiated by the operating system of a compute node. They could be messages communicated between the OS (kernel) on two different compute nodes, or they could be file I/O messages, e.g., such as when a compute node performs a "printf" function, which gets translated into one or more messages between the OS on a compute node OS and the OS on (one or more) I/O nodes of the parallel computing system. In highly parallel computing systems, a plurality of processing nodes may be interconnected to form a network, such as a Torus; or, alternately, may interface with an external communications network for transmitting or receiving messages, e.g., in the form of packets.

As known, a checkpoint refers to a designated place in a program at which normal processing is interrupted specifically to preserve the status information, e.g., to allow resumption of processing at a later time. Checkpointing, is the process of saving the status information. While checkpointing in high performance parallel computing systems is available, generally, in such parallel computing systems, checkpoints are initiated by a user application or program running on a compute node that implements an explicit start checkpointing command, typically when there is no on-going user messaging activity. That is, in prior art user-initiated checkpointing, user code is engineered to take checkpoints at proper times, e.g., when network is empty, no user packets in transit, or MPI call is finished.

However, it is desirable to have the computing system initiate checkpoints, even in the presence of on-going messaging activity. Further, it must be ensured that all incomplete user messages at the time of the checkpoint be delivered in the correct order after the checkpoint. To further complicate matters, the system may need to use the same network as is used for transferring system messages.

It would thus be highly desirable to provide a system and method for checkpointing in parallel, or distributed or multiprocessor-based computer systems that enables system initiation of checkpointing, even in the presence of messaging, at arbitrary times and in a manner invisible to any running user program.

BRIEF SUMMARY

A system, method and computer program product supports checkpointing in a parallel computing system having multiple nodes configured as a network, and, wherein the system, method and computer program product in particular, obtains system initiated checkpoints, even in the presence of on-going user message activity in a network.

As there is provided a separation of network resources and DMA hardware resources used for sending the system messages and user messages, in one embodiment, all user and system messaging be stopped just prior to the start of the checkpoint. In another embodiment, only user messaging be stopped prior to the start of the checkpoint.

Thus, in one aspect, there is provided a system for checkpointing data in a parallel computing system having a plurality of computing nodes, each node having one or more processors and network interface devices for communicating over a network, the checkpointing system comprising: one or more network elements interconnecting the network interface devices of computing nodes via links to form a network; a control device to communicate control signals to each the computing node of the network for stopping receiving and sending message packets at a node, and to communicate further control signals to each the one or more network elements for stopping flow of message packets within the formed network; and, a control unit, at each computing node and at one or more the network elements, responsive to a first control signal to stop each of the network interface devices involved with processing of packets in the formed network, and, to stop a flow of packets communicated on links between nodes of the network; and, the control unit, at each node and the one or more network elements, responsive to second control signal to obtain, from each the plurality of network interface devices, data included in the packets currently being processed, and to obtain from the one or more network elements, current network state information, and, a memory storage device adapted to temporarily store the obtained packet data and the obtained network state information.

Further to this aspect, subsequently, each the control unit at each computing node and at one or more the network elements is responsive to a further control signal to initiate restoring to the network the obtained packet data and the obtained network state information; and, restarting the network.

Furthermore, at each node, the control unit responds to a further control signal to obtain data associated with messaging initiated via a user application, the obtained data including a user application program and associated program data. Subsequently, each the control unit at each computing node responds to another control signal to restore to the network both the obtained packet data and network state information, and to restore the user application program and associated program data.

Further, there is provided a method for checkpointing data in a parallel computing system having a plurality of nodes, each node having one or more processors and network interface devices for communicating over a network, the method comprising: communicating, via a control device, control signals to each the computing node of the network for stopping receiving and sending message packets at a node, and to communicate further control signals to each the one or more network elements for stopping flow of message packets within the formed network; and, responding, at a computing node and at one or more the network elements, to a first control signal for stopping each of the network interface devices from processing packets in the formed network, and, stopping a flow of packets communicated on links between nodes of the network; and, responding, at a computing node and at one or more the network elements, to a second control signal to obtain, from each the plurality of network interface devices, data included in the packets currently being processed, and to obtain from the one or more network elements, current network state information, and, temporarily storing, at a memory storage device, the obtained packet data and the obtained network state information.

A computer program product is provided for performing operations. The computer program product includes a storage medium readable by a processing circuit and storing instructions run by the processing circuit for running a method. The method is the same as listed above.

Advantageously, the system, method and computer program product ensures that that all incomplete user messages at the time of the checkpoint are deliverable in a correct order after performing the checkpoint.

BRIEF DESCRIPTION OF THE SEVERAL VIEWS OF THE DRAWINGS

The objects, features and advantages of the present invention will become apparent to one ordinary skill in the art, in view of the following detailed description taken in combination with the attached drawings, in which:

FIGS. 5A-5C depicts respective control registers 501, 502, 503, each said registers having associated a predetermined address, and associated for user and system use, having a bits set to stop/start operation of particular units involved with system and user messaging in the multiprocessor system shown in FIG. 1;

DETAILED DESCRIPTION

Figure 1:
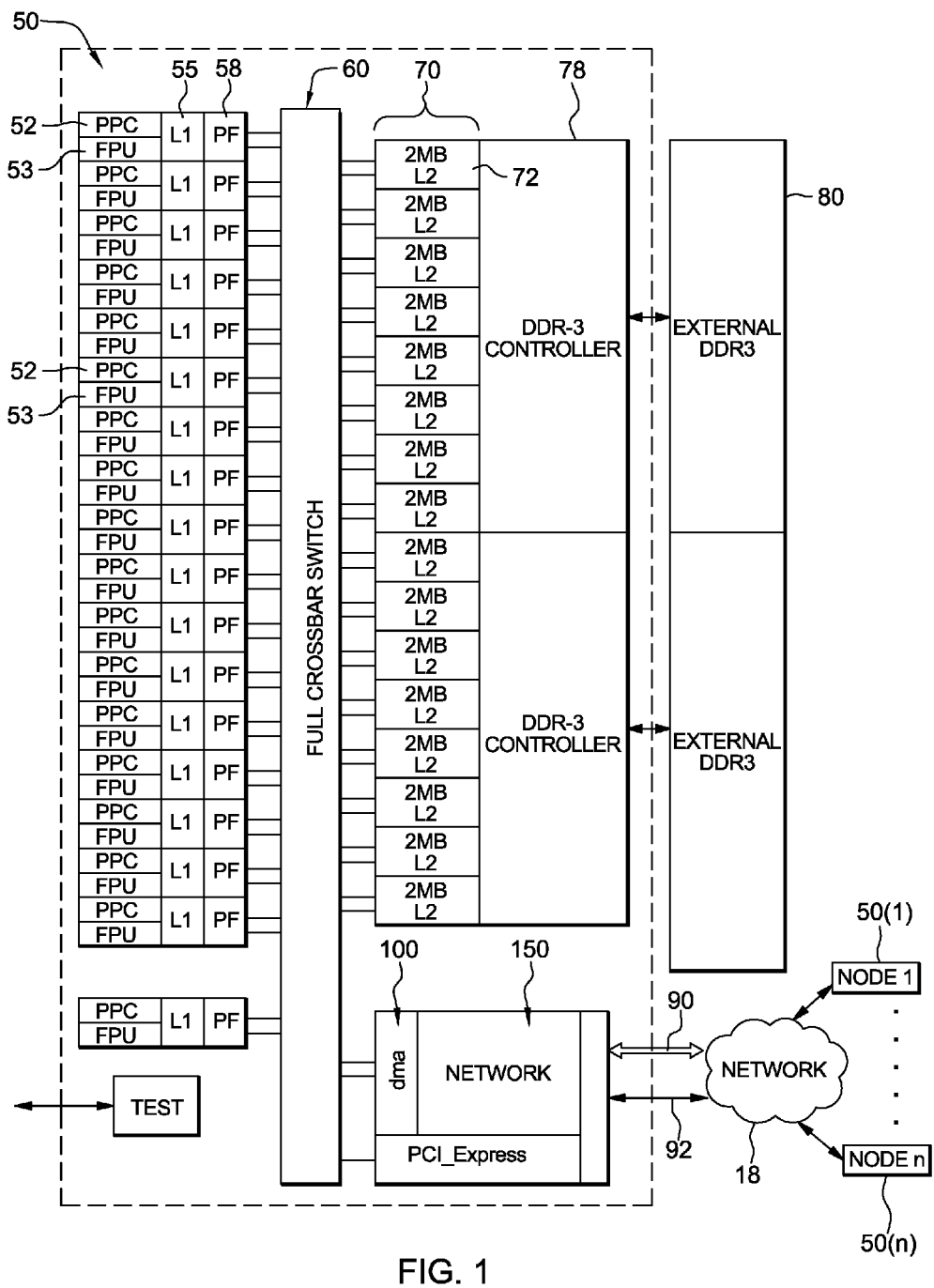
FIG. 1 depicts a schematic of a computing node employing a Messaging Unit including DMA functionality for a parallel computing system according to one embodiment.

FIG. 1 depicts a schematic of a single network compute node 50 in a parallel computing system having a plurality of like nodes each node employing a Messaging Unit 100 according to one embodiment. The computing node 50 for example may be one node in a parallel computing system architecture such as a BlueGene®/Q massively parallel computing system comprising multiple compute nodes 50(1), . . . 50(n), each node including multiple processor cores and each node connectable to a network 18 such as a torus network, or a collective network.

A compute node of this present massively parallel supercomputer architecture and in which the present invention may be employed is illustrated in FIG. 1. The compute nodechip 50 is a single chip ASIC ("Nodechip") based on low power processing core architecture, though the architecture can use any processor cores, and may comprise one or more semiconductor chips. In the embodiment depicted, the node employs PowerPC® A2 at 1600 MHz, and support a 4-way multithreaded 64b PowerPC implementation. Although not shown, each A2 core has its own execution unit (XU), instruction unit (IU), and quad floating point unit (QPU or FPU) connected via an AXU (Auxiliary eXecution Unit). The QPU is an implementation of a quad-wide fused multiply-add SIMD QPX floating point instruction set architecture, producing, for example, eight (8) double precision operations per cycle, for a total of 128 floating point operations per cycle per compute chip. QPX is an extension of the scalar PowerPC floating point architecture. It includes multiple, e.g., thirty-two, 32B-wide floating point registers per thread.

As described herein, one use of the letter "B" represents a Byte quantity, e.g., 2B, 8B, 32B, and 64B represent Byte units. Recitations "GB" represent Gigabyte quantities.

More particularly, the basic nodechip 50 of the massively parallel supercomputer architecture illustrated in FIG. 1 includes multiple symmetric multiprocessing (SMP) cores 52, each core being 4-way hardware threaded, and, including the Quad Floating Point Unit (FPU) 53 on each core. In one example implementation, there is provided sixteen or seventeen processor cores 52, plus one redundant or back-up processor core, each core operating at a frequency target of 1.6 GHz providing, for example, a 563 GB/s memory bandwidth to shared L2 cache 70 via an interconnect device 60, such as a full crossbar switch. In one example embodiment, there is provided 32 MB of shared L2 cache 70, each of sixteen cores core having associated 2 MB of L2 cache 72 in the example embodiment. There is further provided external DDR3 SDRAM (e.g., Double Data Rate synchronous dynamic random access) memory 80, as a lower level in the memory hierarchy in communication with the L2. In one embodiment, the compute node employs or is provided with 8-16 GB memory/node. Further, in one embodiment, the node includes 42.6 GB/s peak DDR3 bandwidth (1.333 GHz DDR3) (2 channels each with chip kill protection).

Each FPU 53 associated with a core 52 provides a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The load interface from the A2 core 52 to the L1P 55 is 32B wide, in one example embodiment, and the store interface is 16B wide, both operating at processor frequency. The L1P 55 implements a fully associative, 32 entry prefetch buffer, each entry holding an L2 line of 128B size, in one embodiment. The L1P provides two prefetching schemes for the private prefetch unit 58: a sequential prefetcher, as well as a list prefetcher.

As shown in FIG. 1, the shared L2 70 may be sliced into 16 units, each connecting to a slave port of the crossbar switch device (XBAR) switch 60. Every physical address is mapped to one slice using a selection of programmable address bits or a XOR-based hash across all address bits. The L2-cache slices, the L1Ps and the L1-D caches of the A2s are hardware-coherent. A group of eight slices may be connected via a ring to one of the two DDR3 SDRAM controllers 78.

Network packet I/O functionality at the node is provided and data throughput increased by implementing MU 100. Each MU at a node includes multiple parallel operating DMA engines, each in communication with the XBAR switch, and a Network Interface unit 150. In one embodiment, the Network interface unit of the compute node includes, in a non-limiting example: 10 intra-rack and inter-rack interprocessor links 90, each operating at 2.0 GB/s, that, in one embodiment, may be configurable as a 5-D torus, for example); and, one I/O link 92 interfaced with the Network interface Unit 150 at 2.0 GB/s (i.e., a 2 GB/s I/O link (to an I/O subsystem)) is additionally provided.

Figure 2:
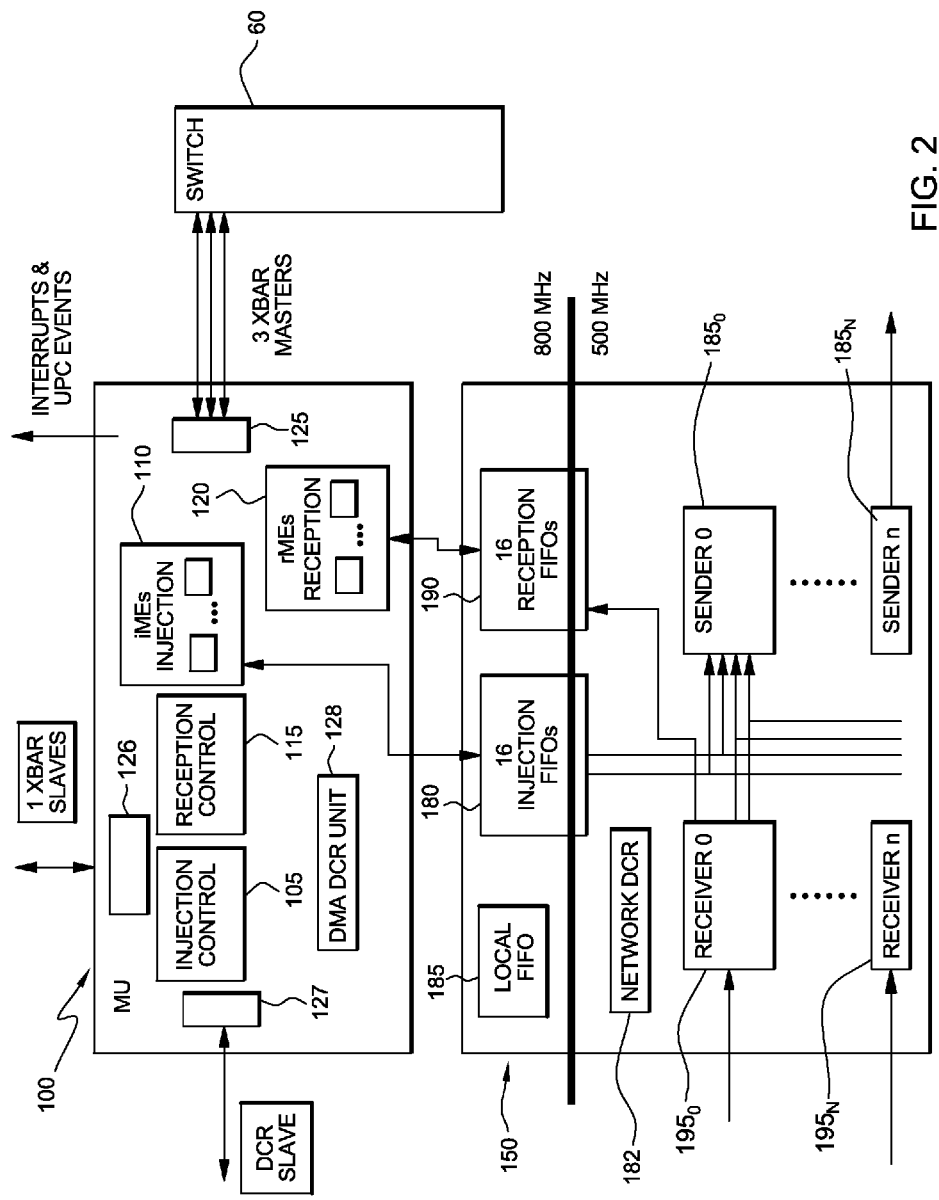
FIG. 2 is a top level architecture of the Messaging Unit 100 interfacing with a Network interface Unit 150 according to one embodiment.

The top level architecture of the Messaging Unit ("MU") interfacing with the Network interface Unit 150 is shown in FIG. 2. The Messaging Unit 100 functional blocks involved with packet injection control as shown in FIG. 2 includes the following: an Injection control unit 105 implementing logic for queuing and arbitrating the processors' requests to the control areas of the injection MU; and, a plurality of Injection iMEs (injection Message Elements) 110 that read data from user and system FIFOs in L2 cache or DDR memory and insert it in the network injection FIFOs 180, or in a local copy FIFO 185. In one embodiment, there are 16 iMEs 110, one for each network injection FIFO 180.

The Messaging Unit 100 functional blocks involved with packet reception control as shown in FIG. 2 include a Reception control unit 115 implementing logic for queuing and arbitrating the requests to the control areas of the reception MU; and, a plurality of Reception rMEs (reception Message Elements) 120 that read data from the network reception FIFOs 190, and insert them into memory or L2. In one embodiment, there are 16 rMEs 120, one for each network reception FIFO 190. A DCR control Unit 128 is provided that includes DCR (control) registers for the MU 100 whose operation will be described in greater detail herein below. In one embodiment, there are 16 rMEs 120, one for each network reception FIFO 190. Generally, each of the rMEs includes a multi-channel DMA engine, including a DMA reception control state machine, byte alignment logic, and control/status registers. For example, in operation, each rME's DMA reception control state machine detects that a paired network FIFO is non-empty, and if it is idle, it obtains the packet header, initiates a read to an SRAM, and controls data transfer to the node memory, e.g., including the transferring of data to an L2 cache memory counter.

As shown in FIG. 2, the herein referred to Messaging Unit 100 implements plural direct memory access engines to off-load the network interface 150. In one embodiment, it transfers blocks via three switch master ports 125 between the L2-caches 70 (FIG. 2) and the reception FIFOs 190 and transmission FIFOs 180 of the network interface unit 150. The MU is additionally controlled by the cores via memory mapped I/O access through an additional switch slave port 126.

In one embodiment, one function of the messaging unit 100 is to ensure optimal data movement to, and from the network into the local memory system for the node by supporting injection and reception of message packets. As shown in FIG. 2, in the network interface 150 the injection FIFOs 180 and reception FIFOs 190 (sixteen for example) each comprise a network logic device for communicating signals used for controlling routing data packets, and a memory for storing multiple data arrays. Each injection FIFOs 180 is associated with and coupled to a respective network sender device $185_n$ (where n=1 to 16 for example), each for sending message packets to a node, and each network reception FIFOs 190 is associated with and coupled to a respective network receiver device $195_n$ (where n=1 to 16 for example), each for receiving message packets from a node. Each sender 185 also accepts packets routing through the node from receivers 195. A network DCR (device control register) 182 is provided that is coupled to the injection FIFOs 180, reception FIFOs 190, and respective network receivers 195, and network senders 185. A complete description of the DCR architecture is available in IBM's Device Control Register Bus 3.5 Architecture Specifications Jan. 27, 2006, which is incorporated by reference in its entirety. The network logic device controls the flow of data into and out of the injection FIFO 180 and also functions to apply 'mask bits', e.g., as supplied from the network DCR 182. In one embodiment, the iME elements communicate with the network FIFOs in the Network interface unit 150 and receives signals from the network reception FIFOs 190 to indicate, for example, receipt of a packet. It generates all signals needed to read the packet from the network reception FIFOs 190. This network interface unit 150 further provides signals from the network device that indicate whether or not there is space in the network injection FIFOs 180 for transmitting a packet to the network and can be configured to also write data to the selected network injection FIFOs.

The MU 100 further supports data prefetching into the memory, and on-chip memory copy. On the injection side, the MU splits and packages messages into network packets, and sends packets to the network respecting the network protocol. On packet injection, the messaging unit distinguishes between packet injection, and memory prefetching packets based on certain control bits in its memory descriptor, e.g., such as a least significant bit of a byte of a descriptor 102 shown in FIG. 8. A memory prefetch mode is supported in which the MU fetches a message into L2, but does not send it. On the reception side, it receives packets from a network, and writes them into the appropriate location in memory, depending on the network protocol. On packet reception, the messaging unit 100 distinguishes between three different types of packets, and accordingly performs different operations. The types of packets supported are: memory FIFO packets, direct put packets, and remote get packets.

With respect to on-chip local memory copy operation, the MU copies content of an area in the local memory to another area in the memory. For memory-to-memory on chip data transfer, a dedicated SRAM buffer, located in the network device, is used.

The MU 100 further includes an Interface to a cross-bar (XBAR) switch 60 in additional implementations. The MU 100 includes three (3) Xbar master devices 125 to sustain network traffic and one Xbar slave 126 for programming. The three (3) Xbar masters 125 may be fixedly mapped to the Injection iMEs (injection Message Elements) 110, such that for example, the iMEs are evenly distributed amongst the three ports to avoid congestion. A DCR slave interface unit 127 providing control signals is also provided.

The handover between network device 150 and MU 100 is performed via buffer memory, e.g., 2-port SRAMs, for network injection/reception FIFOs. The MU 100, in one embodiment, reads/writes one port using, for example, an 800 MHz clock (operates at one-half the speed of a processor core clock, e.g., at 1.6 GHz, or clock/2, for example), and the network reads/writes the second port with a 500 MHz clock (2.0 GB/s network), for example. The handovers are handled using the network FIFOs and FIFOs' pointers (which are implemented using latches, for example).

Figure 3:
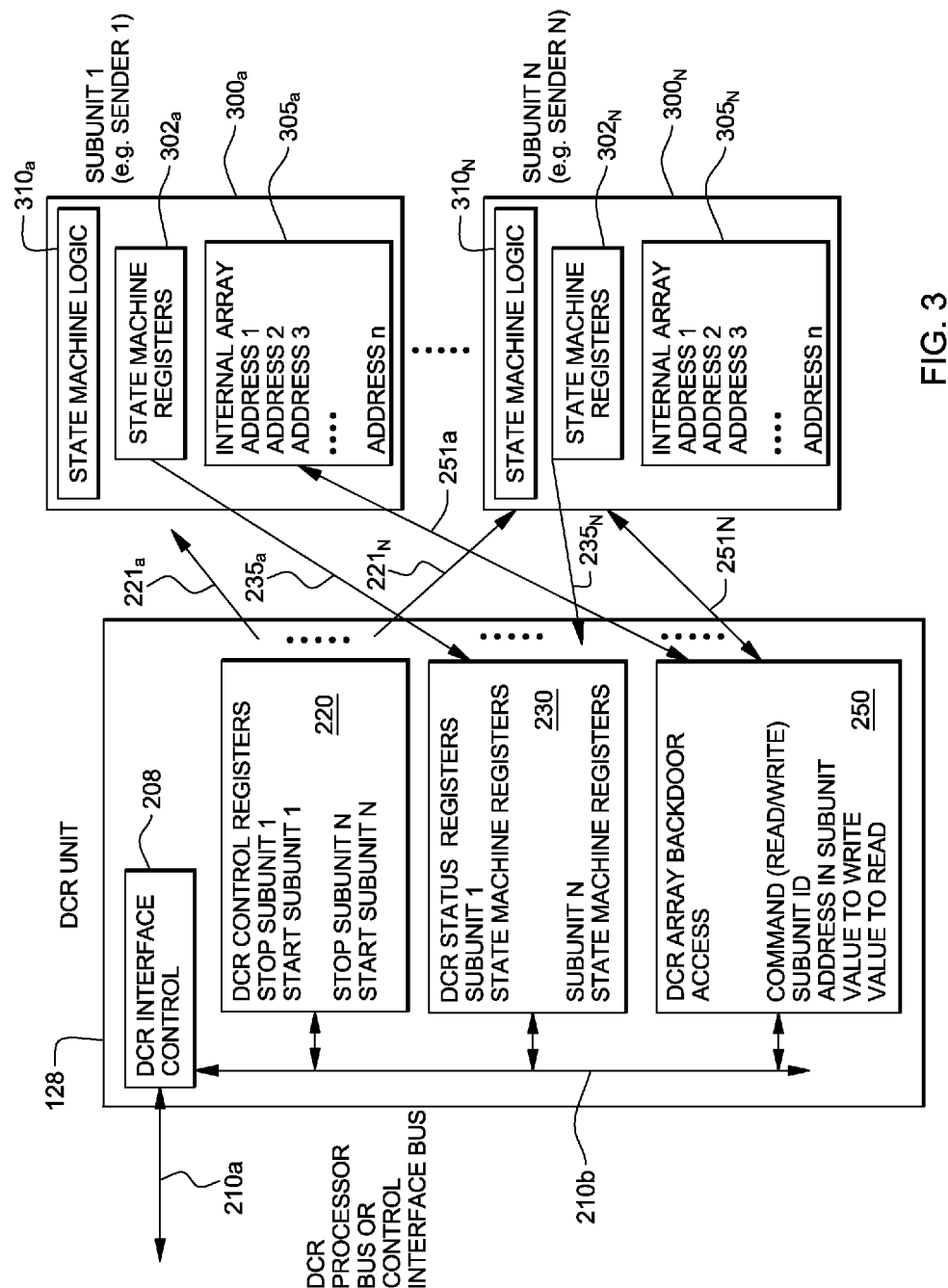
FIG. 3 depicts the system elements interfaced with a control unit involved for checkpointing at one node 50 of a multiprocessor system of FIG. 1, FIGS. 4A-4B depict an example flow diagram depicting a method 400 for checkpoint support in the multiprocessor system shown in FIG. 1.

FIG. 3 particularly, depicts the system elements involved for checkpointing at one node 50 of a multi processor system, such as shown in FIG. 1. While the processing described herein is with respect to a single node, it is understood that the description is applicable to each node of a multiprocessor system and may be implemented in parallel, at many nodes simultaneously. For example, FIG. 3 illustrates a detailed description of a DCR control Unit 128 that includes DCR (control and status) registers for the MU 100, and that may be distributed to include (control and status) registers for the network device (ND) 150 shown in FIG. 2. In one embodiment, there may be several different DCR units including logic for controlling/describing different logic components (i.e., sub-units). In one implementation, the DCR units 128 may be connected in a ring, i.e., processor read/write DCR commands are communicated along the ring—if the address of the command is within the range of this DCR unit, it performs the operation, otherwise it just passes through.

As shown in FIG. 3, DCR control Unit 128 includes a DCR interface control device 208 that interfaces with a DCR processor interface bus 210a, b. In operation, a processor at that node issues read/write commands over the DCR Processor Interface Bus 210a which commands are received and decoded by DCR Interface Control logic implemented in the DCR interface control device 208 that reads/writes the correct register, i.e., address within the DCR Unit 128. In the embodiment depicted, the DCR unit 128 includes control registers 220 and corresponding logic, status registers 230 and corresponding logic, and, further implements DCR Array "backdoor" access logic 250. The DCR control device 208 communicates with each of these elements via Interface Bus 210b. Although these elements are shown in a single unit, as mentioned herein above, these DCR unit elements can be distributed throughout the node. The Control registers 220 affect the various subunits in the MU 100 or ND 150. For example, Control registers may be programmed and used to issue respective stop/start signals 221a, ... 221N over respective conductor lines, for initiating starting or stopping of corresponding particular subunit(s) i, e.g., subunit $300_a, \ldots, 300_N$ (where N is an integer number) in the MU 100 or ND 150 Likewise, DCR Status registers 230 receive signals $235_a, \ldots, 235_N$ over respective conductor lines that reflect the status of each of the subunits, e.g., $300_a, \ldots, 300_N$, from each subunit's state machine $302_a, \ldots, 302_N$, respectively. Moreover, the array backdoor access logic 250 of the DCR unit 128 permits processors to read/write the internal arrays within each subunit, e.g., arrays $305_a, \ldots, 305_N$ corresponding to subunits $300_a, \ldots, 300_N$. Normally, these internal arrays $305_a, \ldots, 305_N$ within each subunit are modified by corresponding state machine control logic $310_a, \ldots, 310_N$ implemented at each respective subunit. Data from the internal arrays $305_a, \ldots, 305_N$ are provided to the array backdoor access logic 250 unit along respective conductor lines $251_a, \ldots, 251_N$. For example, in one embodiment, if a processor issued command is a write, the "value to write" is written into the subunit id's "address in subunit", and, similarly, if the command is a read, the contents of "address in subunit" from the subunit id is returned in the value to read.

Figure 7:
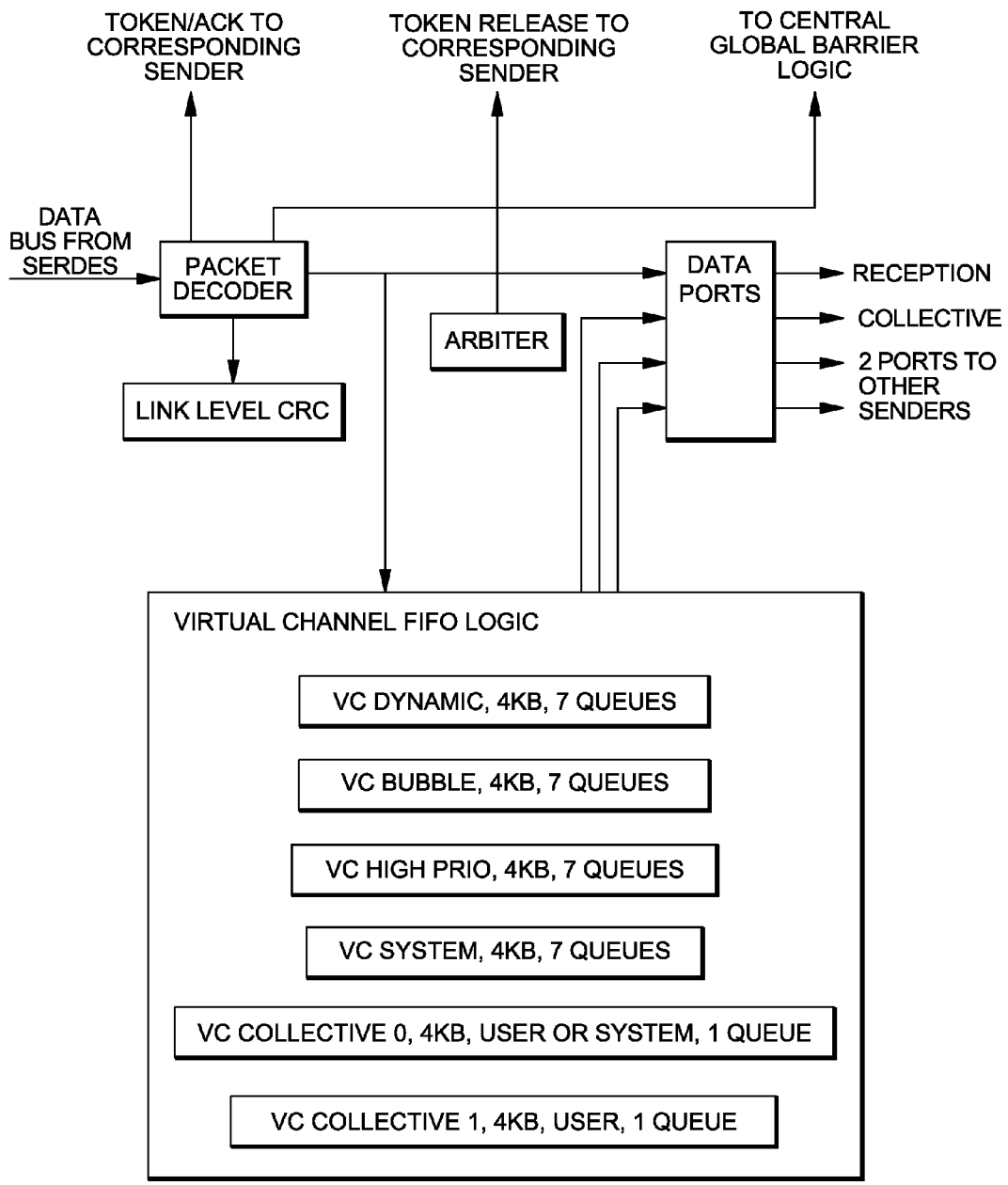
FIG. 7 illustrates in greater detail a receiver block 195 provided in the network logic unit 150 of FIG. 2.
Figure 8:
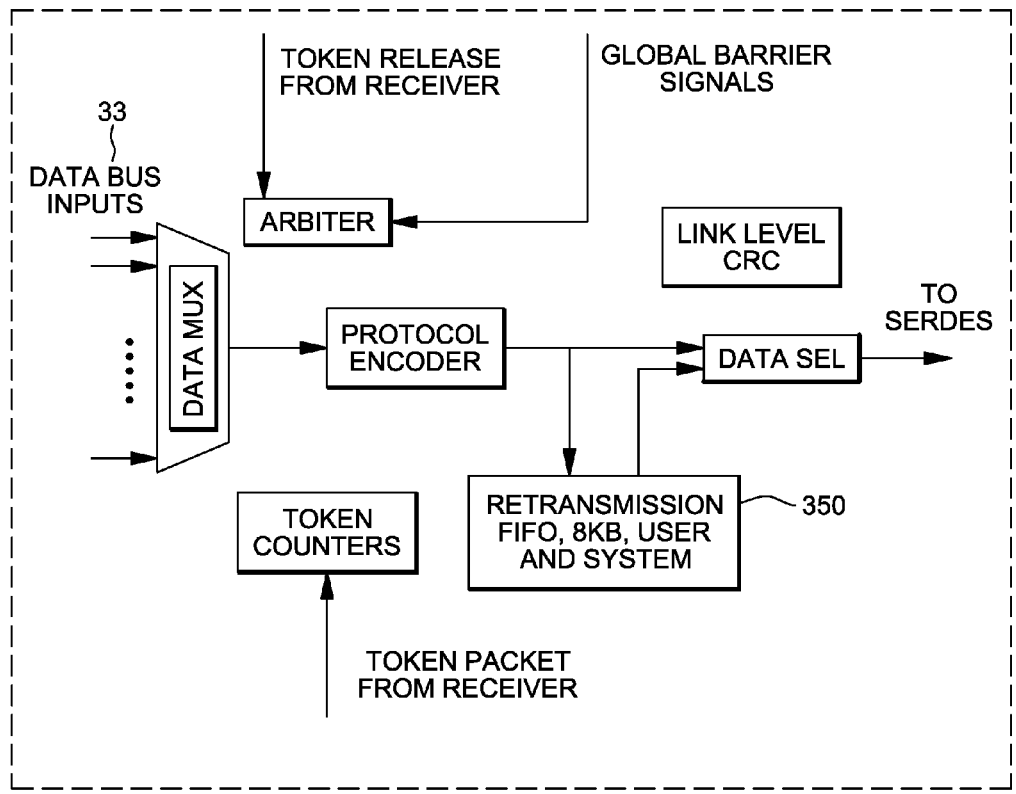
FIG. 8 illustrates in greater detail a sender block 185 provided in the network logic unit 150 of FIG. 2, where both the user and system packets share a hardware resource such as a single retransmission FIFO 350 for transmitting packets when there are link errors; and, FIG. 9 illustrates in greater detail an alternative implementation of a sender block provided in the network logic unit 150 of FIG. 2, where the user and system packets have independent hardware logic units such as a user retransmission FIFO 351 and a system retransmission FIFO 352.

In one embodiment of a multiprocessor system node, such as described herein, there may be a clean separation of network and Messaging Unit (DMA) hardware resources used by system and user messages. In one example, users and systems are provided to have different virtual channels assigned, and different messaging sub-units such as network and MU injection memory FIFOs, reception FIFOs, and internal network FIFOs. FIG. 7 shows a receiver block in the network logic unit 195 in FIG. 2. In one embodiment of the BlueGene/Q network design, each receiver has 6 virtual channels (VCs), each with 4 KB of buffer space to hold network packets. There are 3 user VCs (dynamic, deterministic, high-priority) and a system VC for point-to-point network packets. In addition, there are 2 collective VCs, one can be used for user or system collective packets, the other for user collective packets. In one embodiment of the checkpointing scheme of the present invention, when the network system VCs share resources with user VCs, for example, as shown in FIG. 8, both user and system packets share a single 8 KB retransmission FIFO 350 for retransmitting packets when there are link errors. It is then desirable that all system messaging has stopped just prior to the start of the checkpoint. In one embodiment, the present invention supports a method for system initiated checkpoint as now described with respect to FIGS. 4A-4B.

Figure 4A:
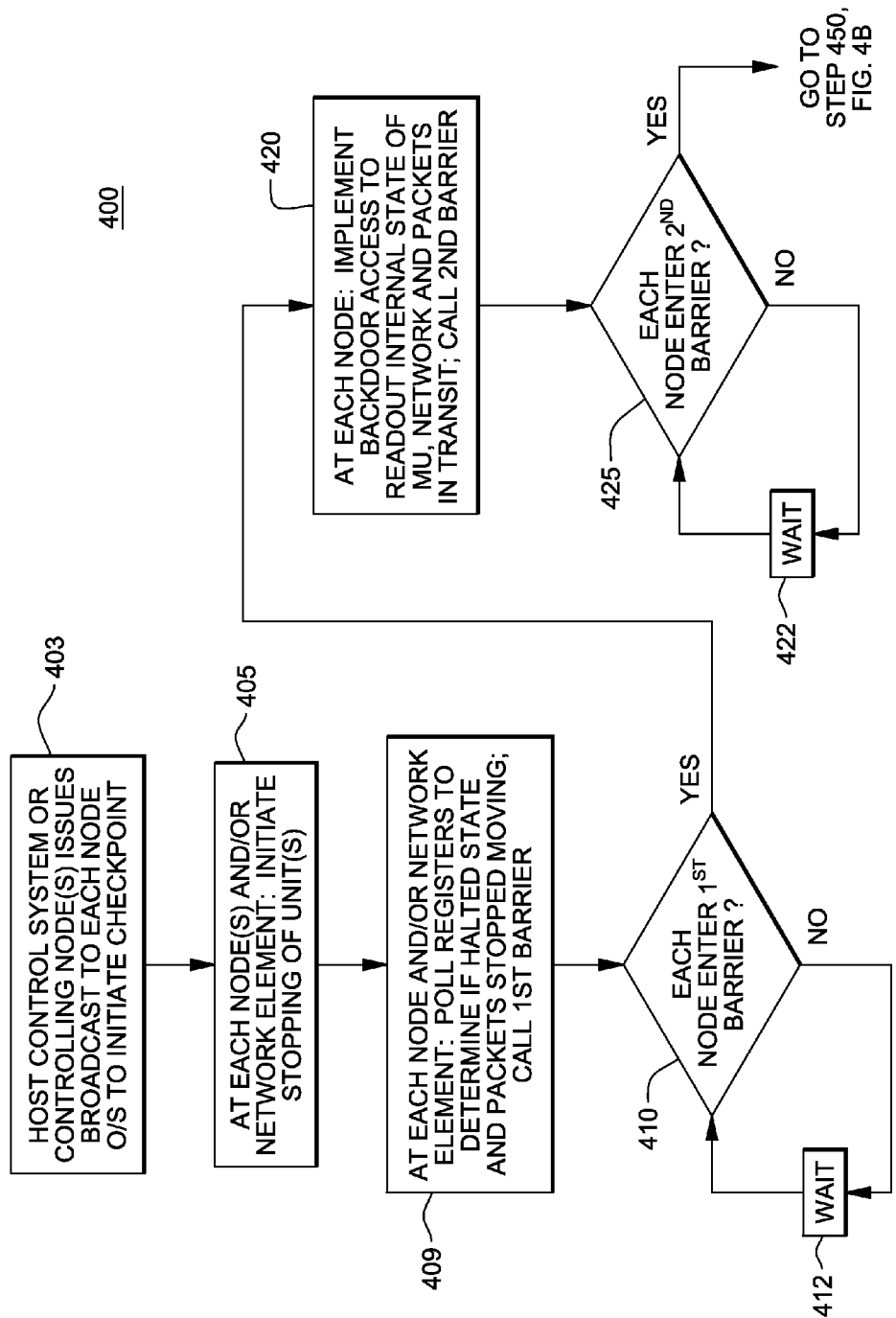

FIGS. 4A-4B depict an example flow diagram depicting a method 400 for checkpoint support in a multiprocessor system, such as shown in FIG. 1. As shown in FIG. 4A, a first step 403 is a step for a host computing system e.g., a designated processor core at a node in the host control system, or a dedicated controlling node(s), to issue a broadcast signal to each node's O/S to initiate taking of the checkpoint amongst the nodes. The user program executing at the node is suspended. Then, as shown in FIG. 4A, at 405, in response to receipt of the broadcast signal to the relevant system compute nodes, the O/S operating at each node will initiate stopping of all unit(s) involved with message passing operations, e.g., at the MU and network device and various sub-units thereof.

Thus, for example, at each node(s), the DCR control unit for the MU 100 and network device 150 is configured to issue respective stop/start signals 221a, ... 221N over respective conductor lines, for initiating starting or stopping of corresponding particular subunit(s), e.g., subunit $300_a, \ldots, 300_N$. In an embodiment described herein, for checkpointing, the sub-units to be stopped may include all injection and reception sub-units of the MU (DMA) and network device. For example, in one example embodiment, there is a Start/stop DCR control signal, e.g., a set bit, associated with each of the iMEs 110, rMEs 120, injection control FSM (finite state machine), Input Control FSM , and all the state machines that control injection and reception of packets. Once stopped, new packets cannot be injected into the network or received from the network.

For example, each iME and rME can be selectively enabled or disabled using a DCR register. For example, an iME/rME is enabled when the corresponding DCR bit is 1 at the DCR register, and disabled when it is 0. If this DCR bit is 0, the rME will stay in the idle state or another wait state until the bit is changed to 1. The software executing on a processor at the node sets a DCR bit. The DCR bits are physically connected to the iME/rMEs via a "backdoor" access mechanism including separate read/write access ports to buffers arrays, registers, and state machines, etc. within the MU and Network Device. Thus, the register value propagates to iME/rME registers immediately when it is updated.

The control or DCR unit may thus be programmed to set a Start/stop DCR control bit provided as a respective stop/start signal $221a, \ldots, 221N$ corresponding to the network injection FIFOs to enable stop of all network injection FIFOs. As there is a DCR control bit for each subunit, these bits get fed to the appropriate iME FSM logic which will, in one embodiment, complete any packet in progress and then prevent work on subsequent packets. Once stopped, new packets will not be injected into the network. Each network injection FIFO can be started/stopped independently.

Figure 6:
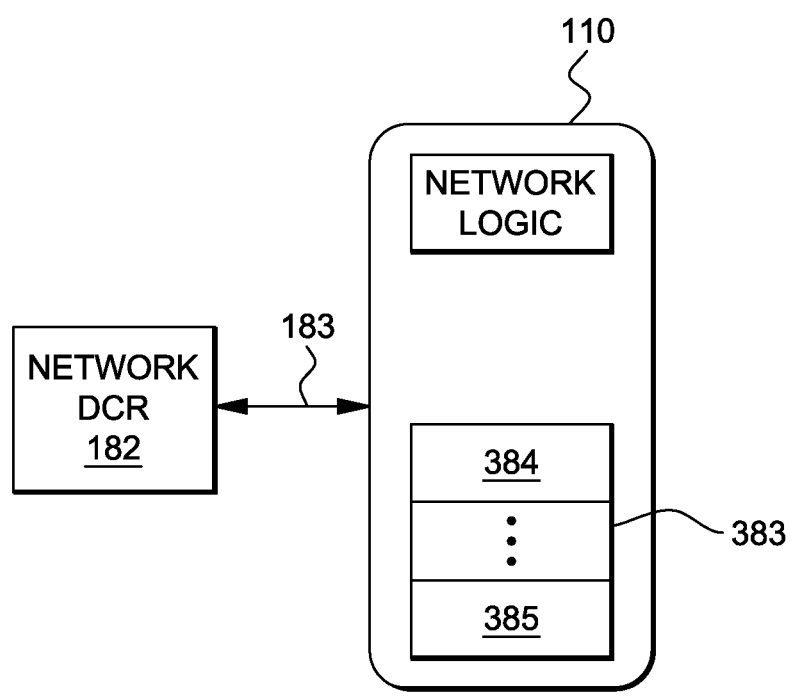
FIG. 6 depicts a backdoor access mechanism including an example network DCR register 182 shown coupled over conductor or data bus 183 to a device, such as, an injection FIFO 110.

As shown in FIG. 6 illustrating the referred to backdoor access mechanism, a network DCR register 182 is shown coupled over conductor or data bus 183 with one injection FIFO 110, (where i=1 to 16 for example) that includes a network logic device 381 used for the routing of data packets stored in data arrays 383, and including controlling the flow of data into and out of the injection FIFO $110_i$, and, for accessing data within the register array for purposes of checkpointing via an internal DCR bus. While only one data array 383 is shown, it is understood that each injection FIFO 110, may contain multiple memory arrays for storing multiple network packets, e.g., for injecting packets 384 and 385.

Further, the control or DCR unit sets a Start/stop DCR control bit provided as a respective stop/start signal $221a, \ldots 221N$ corresponding to network reception FIFOs to enable stop of all network reception FIFOs. Once stopped, new packets cannot be removed from the network reception FIFOs. Each FIFO can be started/stopped independently. That is, as there is a DCR control bit for each subunit, these bits get fed to the appropriate FSM logic which will, in one embodiment, complete any packet in progress and then prevent work on subsequent packets. It is understood that a network DCR register 182 shown in FIG. 6 is likewise coupled to each reception FIFO for controlling the flow of data into and out of the reception FIFO $120_i$, and, for accessing data within the register array for purposes of checkpointing.

In an example embodiment, for the case of packet reception, if this DCR stop bit is set to logic 1, for example, while the corresponding rME is processing a packet, the rME will continue to operate until it reaches either the idle state or a wait state. Then it will stay in the state until the stop bit is removed, or set to logic 0, for example. When an rME is disabled (e.g., stop bit set to 1), even if there are some available packets in the network device's reception FIFO, the rME will not receive packets from the network FIFO. Therefore, all messages received by the network FIFO will be blocked until the corresponding rME is enabled again.

Further, the control or DCR unit sets a Start/stop DCR control bit provided as a respective stop/start signal $221a, \ldots 221N$ corresponding to all network sender and receiver units such as sender units $185_0\text{-}185_N$ and receiver units $195_0\text{-}195_N$ shown in FIG. 2. FIG. 5A, particularly depicts DCR control registers 501 at predetermined addresses, some associated for user and system use, having a bit set to stop operation of Sender Units, Receiver Units, Injection FIFOs, Rejection FIFOs. That is, a stop/start signal may be issued for stop/starting all network sender and receiver units. Each sender and receiver can be started/stopped independently. FIG. 5A and FIG. 5B depicts example (DCR) control registers 501 that support Injection//Reception FIFO control at the network device (FIG. 5A) used in stopping packet processing, and, example control registers 502 that support resetting Injection//Reception FIFOs at the network device (FIG. 5B). FIG. 5C depicts example (DCR) control registers 503 that are used to stop/start state machines and arrays associated with each link's send (Network Sender units) and receive logic (Receiver units) at the network device 150 for checkpointing.

In the system shown in FIG. 1, there may be employed a separate external host control network that may include Ethernet and/or JTAG [(Joint Test Action Group) IEEE Std 1149.1-1990)] control network interfaces, that permits communication between the control host and computing nodes to implement a separate control host barrier. Alternately, a single node or designated processor at one of the nodes may be designated as a host for purposes of taking checkpoints.

That is, the system of the invention may have a separate control network, wherein each compute node signals a "barrier entered" message to the control network, and it waits until receiving a "barrier completed" message from the control system. The control system implemented may send such messages after receiving respective barrier entered messages from all participating nodes.

Thus, continuing in FIG. 4A, after initiating checkpoint at 405, the control system then polls each node to determine whether they entered the first barrier. At each computing node, when all appropriate sub-units in that node have been stopped, and when all packets can no longer move in the network (message packet operations at each node cease), e.g., by checking state machines, at 409, FIG. 4A, the node will enter the first barrier. When all nodes entered the barrier, the control system then broadcasts a barrier done message through the control network to each node. At 410, the node determines whether all process nodes of the network subject to the checkpoint have entered the first barrier. If all process nodes subject to the checkpoint have not entered the first barrier, then, in one embodiment, the checkpoint process waits at 412 until each of the remaining nodes being processed have reached the first barrier. For example, if there are retransmission FIFOs for link-level retries, it is determined when the retransmission FIFOs are empty. That is, as a packet is sent from one node to another, a copy is put into a retransmission FIFO. According to a protocol, a packet is removed from retransmission FIFO when acknowledgement comes back. If no acks come back for a predetermined timeout period, packets from the retransmission FIFO are retransmitted in the same order to the next node.

As mentioned, each node includes "state machine" registers (not shown) at the network and MU devices. These state machine registers include unit status information such as, but not limited to, FIFO active, FIFO currently in use (e.g., for remote get operation), and whether a message is being processed or not. These status registers can further be read (and written to) by system software at the host or controller node.

Thus, when it has been determined at the computer nodes forming a network (e.g., a Torus or collective) to be checkpointed that all user programs have been halted, and all packets have stopped moving according to the embodiment described herein, then, as shown at step 420, FIG. 4A, each node of the network is commanded to store and read out the internal state of the network and MU, including all, packets in transit. This may be performed at each node using a "backdoor" read mechanism. That is, the "backdoor" access devices perform read/write to all internal MU and network registers and buffers for reading out from register/SRAM buffer contents/state machines/link level sequence numbers at known backdoor access address locations within the node, when performing the checkpoint and, eventually write the checkpoint data to external storage devices such as hard disks, tapes, and/or non-volatile memory. The backdoor read further provides access to all the FSM registers and the contents of all internal SRAMS, buffer contents and/or register arrays.

In one embodiment, these registers may include packets ECC or parity data, as well as network link level sequence numbers, VC tokens, state machine states (e.g., status of packets in network), etc., that can be read and written. In one embodiment, the checkpoint reads/writes are read by operating system software running on each node. Access to devices is performed over a DCR bus that permits access to internal SRAM or state machine registers and register arrays, and state machine logic, in the MU and network device, etc. as shown in FIGS. 2 and 3. In this manner, a snapshot of the entire network including MU and networked devices, is generated for storage.

Returning to FIG. 4A, at 425, it is determined whether all checkpoint data and internal node state and system packet data for each node, has been read out and stored to the appropriate memory storage, e.g., external storage. For example, via the control network if implemented, or a supervising host node within the configured network, e.g., Torus, each compute node signals a "barrier entered" message (called the $2^{nd}$ barrier) once all checkpoint data has been read out and stored. If all process nodes subject to the checkpoint have not entered the $2^{nd}$ barrier, then, in one embodiment, the checkpoint process waits at 422 until each of the remaining nodes being processed have entered the second barrier, upon which time checkpointing proceeds to step 450 FIG. 4B.

Proceeding to step 450, FIG. 4B, it is determined by the compute node architecture whether the computer nodes forming a network (e.g., a Torus or collective) to be checkpointed permits selective restarting of system only units as both system and users may employ separate dedicated resources (e.g., separate FIFOs, separate Virtual Channels). For example, FIG. 8 shows an implementation of a retransmission FIFO 350 in the network sender 185 logic where the retransmission network packet buffers are shared between user and system packets. In this architecture, it is not possible to reset the network resources related to user packets separately from system packets, and therefore the result of step 450 is a "no" and the process proceeds to step 460.

Figure 9:
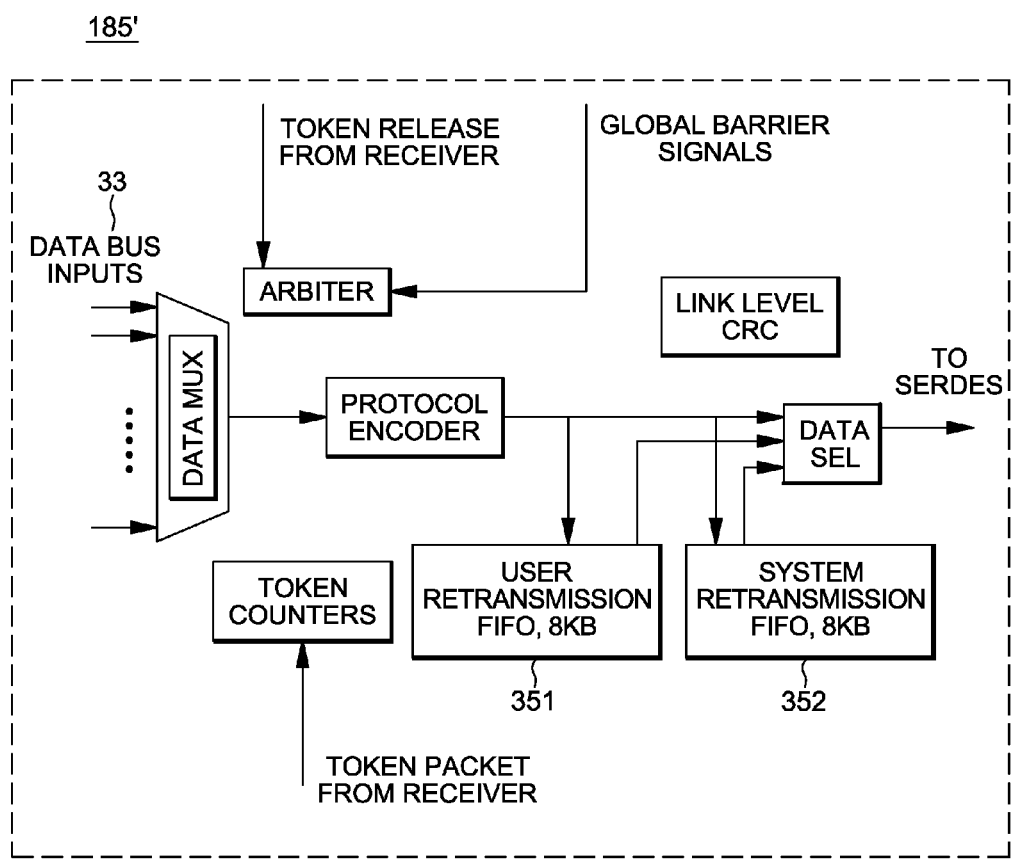

In another implementation of the network sender 185' illustrated in FIG. 9, user packets and system packets have respective separated retransmission FIFOs 351, 352 respectively, that can be reset independently. There are also separate link level packet sequence numbers for user and system traffic. In this latter case, thus, it is possible to reset the logic related to user packets without disturbing the flow of system packets, thus the result of step 450 is "yes". Then the logic is allowed to continue processing system only packets via backdoor DCR access to enable network logic to process system network packets. With a configuration of hardware, i.e., logic and supporting registers that support selective re-starting, then at 455, the system may release all pending system packets and start sending the network/MU state for checkpointing over the network to an external system for storing to disk, for example, while the network continues running, obviating the need for a network reset. This is due to additional hardware engineered logic forming an independent system channel which means the checkpointed data of the user application as well as the network status for the user channels can be sent through the system channel over the same high speed torus or collective network without needing a reset of the network itself.

For restarting, there is performed setting the unit stop DCR bits to logic "0", for example, bits in DCR control register 501 (e.g., FIG. 5A) and permitting the network logic to continue working on the next packet, if any. To perform the checkpoint may require sending messages over the network. Thus, in one embodiment, there is permitted only system packets, those involved in the checkpointing, to proceed. The user resources, still remain halted in the embodiment employing selective restarting.

Returning to FIG. 4B, if, at step 450, it is determined that such a selective restart is not feasible, the network and MU are reset in a coordinated fashion at 460 to remove all packets in network.

Thus, if selective re-start can not be performed, then the entire network is Reset which effectively rids the network of all packets (e.g., user and system packets) in network. After the network reset, only system packets will be utilized by the OS running on the compute node. Subsequently, the system using the network would send out information about the user code and program and MU/network status and writes that to disk, i.e., the necessary network, MU and user information is checkpointed (written out to external memory storage, e.g., disk) using the freshly reset network. The user code information including the network and MU status information is additionally checkpointed.

Then, all other user state, such as user program, main memory used by the user program, processor register contents and program control information, and other checkpointing items defining the state of the user program, are checkpointed. For example, as memory is the content of all user program memory, i.e., all the variables, stacks, heap is checkpointed. Registers include, for example, the core's fixed and floating point registers and program counter. The checkpoint data is written to stable storage such as disk or a flash memory, possibly by sending system packets to other compute or I/O nodes. This is so the user application is later restarted at the exactly same state it was in.

In one aspect, these contents and other checkpointing data are written to a checkpoint file, for example, at a memory buffer on the node, and subsequently written out in system packets to, for example, additional I/0 nodes or control host computer, where they could be written to disk, attached harddrive optical, magnetic, volatile or non-volatile memory storage devices, for example. In one embodiment the checkpointing may be performed in a non-volatile memory (e.g., flash memory, phase-change memory, etc) based system, i.e., with checkpoint data and internal node state data expediently stored in a non-volatile memory implemented on the computer node, e.g., before and/or in addition to being written out to I/O, such as described in commonly-owned co-pending U.S. Pat. No. 8,788,879, the whole content and disclosure of which is incorporated by reference as if fully set forth herein. The checkpointing data at a node could further be written to possibly other nodes where stored in local memory/flash memory.

Continuing, after user data is checkpointed, at 470, FIG. 4B, the backdoor access devices are utilized, at each node, to restore the network and MU to their exact user states at the time of the start of the checkpoint. This entails writing all of the checkpointed data back to the proper registers in the units/sub-units using the read/write access. Then the user program, network and MU are restarted from the checkpoint. If an error occurs between checkpoints (e.g., ECC shows uncorrectable error, or a crash occurs), such that the application must be restarted from a previous checkpoint, the system can reload user memory and reset the network and MU state to be identical to that at the time of the checkpoint, and the units can be restarted.

After restoring the network state at each node, a call is made to a third barrier. The system thus ensures that all nodes have entered the barrier after each node's state has restored from a checkpoint (i.e., have read from stable storage and restored user application and network data and state. The system will wait until each node has entered the third data barrier such as shown at steps 472, 475 before resuming processing.

From the foregoing, the system and methodology can restart the user application at exactly the same state in which it was in at time of entering the checkpoint. With the addition of system checkpoints, in the manner as described herein checkpointing can be performed anytime while a user application is still running.

In an alternate embodiment, two external barriers could be implemented, for example, in a scenario where system checkpoint is taken and the hardware logic is engineered so as not to have to perform a network reset, i.e., system is unaffected while checkpointing user. That is, after first global barrier is entered upon halting all activity, the nodes may perform checkpoint read step using backdoor access feature, and write checkpoint data to storage array or remote disk via the hardware channel. Then, these nodes will not need to enter or call the second barrier after taking checkpoint due to the use of separate built in communication channel (such as a Virtual Channel). These nodes will then enter a next barrier (the third barrier as shown in FIG. 4B) after writing the checkpoint data.

Figure 1A:
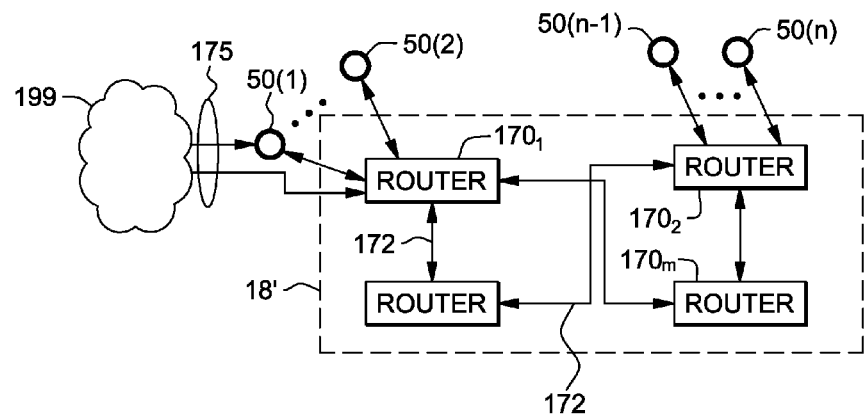
FIG. 1A shows in greater detail a network configuration including an inter-connection of separate network chips forming a multi-level switch interconnecting plural computing nodes of a network in one embodiment.

The present invention can be embodied in a system in which there are compute nodes and separate networking hardware (switches or routers) that may be on different physical chips. For example, network configuration shown in FIG. 1A in greater detail, show an inter-connection of separate network chips, e.g., router and/or switch devices $170_1$, $170_2, \ldots, 170_m$, i.e., separate physical chips interconnected via communication links 172. Each of the nodes $50(1), \ldots, 50(n)$ connect with the separate network of network chips and links forming network, such as a multi-level switch 18', e.g., a fat-tree. Such network chips may or may not include a processor that can be used to read and write the necessary network control state and packet data. If such a processor is not included on the network chip, then the necessary steps normally performed by a processor can instead be performed by the control system using appropriate control access such as over a separate JTAG or Ethernet network 199 as shown in FIG. 1A. For example, control signals 175 for conducting network checkpointing of such network elements (e.g., router and switches $170_1, 170_2, \ldots, 170_m$) and nodes $50(1), \ldots, 50(n)$ are communicated via control network 199. Although a single control network connection is shown in FIG. 1A, it is understood that control signals 175 are communicated with each network element in the network 18'. In such an alternative network topology, the network 18' shown in FIG. 1A, may comprise or include a cross-bar switch network, where there are both compute nodes $50(1), \ldots, 50(n)$ and separate switch chips $170_1, 170_2, \ldots, 170_m$—the switch chip including only network receivers, senders and associate routing logic, for example. There may additionally be some different control processors in the switch chip also. In this implementation, the system and method stop packets in both the compute node and the switch chips.

Figure 1B:
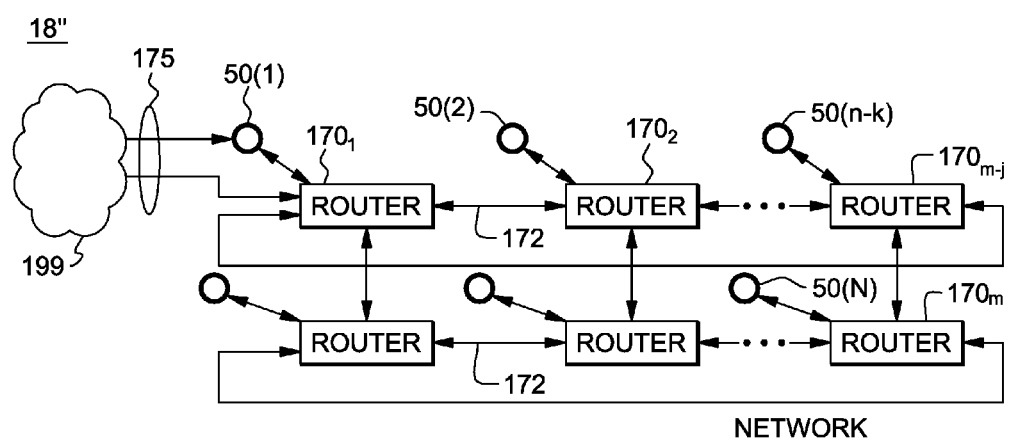
FIG. 1B shows in greater detail an example network configuration wherein a compute node comprises a processor(s), memory, network interface however, in the network configuration, may further include a router device, e.g., either on the same physical chip, or, on another chip.

In the further embodiment of a network configuration 18'' shown in FIG. 1B, a 2D Torus configuration is shown, where a compute node $50(1), \ldots, 50(n)$ comprises a processor(s), memory, network interface such as shown in FIG. 1. However, in the network configuration 18', the compute node may further include a router device, e.g., on the same physical chip, or, the router (and/or switch) may reside physically on another chip. In the embodiment where the router (and/or switch) resides physically on another chip, the network includes an inter-connection of separate network elements, e.g., router and/or switch devices $170_1, 170_2, \ldots, 170_m$, shown connecting one or more compute nodes $50(1), \ldots, 50(n)$, on separate chips interconnected via communication links 172 to form an example 2D Torus. Control signals 175 from control network may be communicated to each of the nodes and network elements, with one signal being shown interfacing control network 199 with one compute node 50(1) for illustrative purposes. These signals enable packets in both the compute node and the switch chips to be stopped/started and checkpoint data read according to logic implemented in the system and method. It is understood that control signals 175 may be communicated to each network element in the network 18''. Thus, in one embodiment, the information about packets and state is sent over the control network 199 for storage over the control network by the control system. When the information about packets and state needs to be restored, it is sent back over the control network and put in the appropriate registers/SRAMS included in the network chip(s).

Further, the entire machine may be partitioned into subpartitions each running different user applications. If such subpartitions share network hardware resources in such a way that each subpartition has different, independent network input (receiver) and output (sender) ports, then the present invention can be embodied in a system in which the checkpointing of one subpartition only involves the physical ports corresponding to that subpartition. If such subpartitions do share network input and output ports, then the present invention may be embodied in a system in which the network can be stopped, checkpointed and restored, but only the user application running in the subpartition to be checkpointed is checkpointed while the applications in the other subpartitions continue to run.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 4A, 4B, the flowchart and block diagrams in illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new, and desire to secure by Letters Patent is:

1. A system for checkpointing data in a parallel computing system having a plurality of computing nodes, each node having one or more processors and network interface devices for communicating system and user application messages over a network, said checkpointing system comprising:
   one or more network elements interconnecting said network interface devices of computing nodes via links to form a network;
   a system control device to communicate control signals to each said computing node of said network for stopping receiving and sending message packets at a node, and to communicate further control signals to each said one or more network interface elements for stopping flow of message packets within said formed network;
   a control unit, at each computing node and at one or more said network elements, responsive to control signals to stop each of said network elements and stop each said network interface device involved with processing of packets in said formed network including stopping (direct memory access) DMA packet injection and packet reception sub-units at each node to prevent new packets from being injected into or received from the network, and, to stop a flow of packets communicated on links between nodes of said network; and, said control unit at each node and said one or more network elements, responsive to said further control signals to obtain and save network packet data and network control state information in both said network interface devices and network elements, and, said control unit further restoring all network packet data to both said network interface devices and network elements, prior to enabling network traffic and computations to resume, a memory storage device being adapted to temporarily store said obtained network packet data and said network control state information, and said system including a separate control network, and said separate control network including a host control device, which is configured to communicate with each said nodes and said separate network permitting communication between said nodes, said separate control network implementing a barrier wherein each compute node signals a "barrier entered" message to the separate control network, and waits until receiving a "barrier completed" message from the host control device of said separate control network, wherein each said computing node further comprises:

state machine registers for temporarily storing said network state information, said host control device reading said state machine registers for determining when all units have stopped and all packet flows are no longer in transit along links in the network; each node including a read/write mechanism for respectively reading and writing to all internal network elements including network register and buffers.

2. The system as claimed in claim 1, wherein based on a first control signal for stopping DMA packet injection and reception, said control unit generating control signals to independently start/stop running of each of: a first in first out (FIFO) network packet injection register and a FIFO network packet reception register.

3. The system as claimed in claim 1, wherein based on said first control signal, said control unit further comprising: generating further control signals for independently starting/stopping running of each of: a network message sender device and a network message receiver device.

4. The system as claimed in claim 2, wherein each said computing node further includes one or more packet retransmission FIFO elements, wherein based on said first control signal, said control unit further determining when said packet retransmission FIFO elements are empty.

5. The system as claimed in claim 1, wherein said read/write mechanism stores checkpointing data into a memory buffer on the node and subsequently writes out said data in system packets to a memory storage disk device or a flash memory device.

6. The system as claimed in claim 5, wherein said control unit is further configured to perform: determining when user programs have been halted and all packets have stopped moving, and upon said determination, said read/write mechanism for reading out an entire internal state of the network interface devices, including all packets in transit on said links.

7. The system as claimed in claim 6, wherein said control unit determines whether selective restarting of system only units is permitted, and in response to determining selective restarting is permitted, said control unit releasing system packets, and performing checkpointing of said read internal state of the network interface devices, including a state of data of packets in transit over the network, to said memory storage device.

8. The system as claimed in claim 7, wherein in addition, a user state, including a user program, memory register contents and program control information is further checkpointed.

9. The system as claimed in claim 7, wherein if determined that selective restarting of system only units is not permitted, said host control and system control devices initiating re-setting of the network interface devices and network elements in a coordinated fashion and, then checkpointing each said internal network interface device state and user application information using the reset network elements and interface devices.

10. The system as claimed in claim 1, wherein all network state, including all packets in transit that have left a source compute node, but has not reached the destination node, are checkpointed without implementing an end-to-end reliability protocol to retransmit any packets lost during said checkpoint.

11. A method for checkpointing data in a parallel computing system having a plurality of nodes, each node having one or more processors and network interface devices for communicating packets over a network, and one or more network elements interconnecting said network interface devices of computing nodes via links to form a network, said method comprising:

communicating, via a control device, control signals to each said computing node of said network for stopping receiving and sending message packets at a node, and to communicate further control signals to each said one or more network interface elements for stopping flow of message packets within said formed network;

responding, at a computing node and at one or more said network elements, to a control signal for stopping each of said network elements and stopping each said network interface devices involved with processing packets in said formed network, including stopping (direct memory access) DMA packet injection and packet reception sub-units at each node to prevent new packets from being injected into or received from the network, and, stopping a flow of packets communicated on links between nodes of said network; and, responding, at a computing node and at one or more said network elements, to said further control signals to obtain and save, from each said plurality of nodes, network packet data and network control state information in both said network interface devices and network elements, and, subsequently restoring, by said control device, all network packet data to both said network interface devices and network elements, prior to enabling network traffic and computations to resume, and said control device comprising a host control device of a separate control network, said host control device communicating with each said nodes and said separate network permitting communication between each said nodes, said separate control network implementing a barrier wherein each compute node signals a "barrier entered" message to the separate control network, and waits until receiving a "barrier completed" message from the host control device of said separate control network, and temporarily storing, at a memory storage device, said obtained network packet data and network control state information, wherein one or more state machine registers at each said computing node is configured for:

temporarily storing said network state information, said host control device reading said state machine registers for determining when all units have stopped and all packet flows are no longer in transit along links in the network; each node including a read/write mechanism for respectively reading and writing to all internal network elements including network registers and buffers.

12. The method as claimed in claim 11, further comprising: generating, based on a control signal for stopping DMA packet injection and reception, control signals to independently start/stop running of each of: a first in first out (FIFO) network packet injection register and a FIFO network packet reception register.

13. The method as claimed in claim 11, further comprising: generating, based on a control signal, further control signals for independently starting/stopping running of each of: a network message sender device for sending packets over links and a network message receiver device for receiving packets over links.

14. The method as claimed in claim 11, wherein each said computing node further includes one or more packet retransmission FIFO elements, wherein based on said control signal, said control unit further determining when said packet retransmission FIFO elements are empty.

15. The method as claimed in claim 11, storing, via said read/write mechanism, checkpointing data into a memory buffer on the node and subsequently writing out said data in system packets to a memory storage disk device or a flash memory device.

16. The method as claimed in claim 15, further comprising: determining, by said control unit, when user programs have been halted and all packets have stopped moving, and upon said determination, reading out an entire internal state of the network interface devices, including all packets in transit on said links, via said read/write mechanism.

17. The method as claimed in claim 16, further comprising: determining, by said control device, whether selective restarting of system only units is permitted, and in response to determining selective restarting is permitted, releasing system packets, and performing checkpointing of said read internal network state of the network interface devices, including state of data of packets in transit over the network, to said memory storage device.

18. The method as claimed in claim 17, wherein in addition, a user state, including a user program, memory register contents and program control information is further checkpointed.

19. The method as claimed in claim 17, wherein responsive to determining that selective restarting of system only units is not permitted, initiating, by said host control and control devices at nodes of the network, re-setting of interface devices and network elements in a coordinated fashion and, then checkpointing each said internal network interface device state and user application information using the reset network elements and interface devices.

20. The method as claimed in claim 11, wherein all network state, including all packets in transit that have left a source compute node, but has not reached the destination node, are checkpointed without implementing an end-to-end reliability protocol to retransmit any packets lost during said checkpoint.

* * * * *